US008886217B2

(12) United States Patent  
Reitter et al.

(10) Patent No.: US 8,886,217 B2  
(45) Date of Patent: Nov. 11, 2014

(54) LOCATION-SENSITIVE SECURITY LEVELS AND SETTING PROFILES BASED ON DETECTED LOCATION

(71) Applicant: Apple Inc., Cupertino, CA (US)

(72) Inventors: Alexander Reitter, Sunnyvale, CA (US); David Amm, Morgan Hill, CA (US); Julian Missig, Redwood City, CA (US); Raymond Walsh, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/731,893

(22) Filed: Dec. 31, 2012

(65) Prior Publication Data

US 2014/0187200 A1  Jul. 3, 2014

(51) Int. Cl.
 H04W 12/08   (2009.01)
 H04W 4/02   (2009.01)
 H04W 4/04   (2009.01)

(52) U.S. Cl.
 CPC .............. *H04W 12/08* (2013.01); *H04W 4/04* (2013.01); *H04W 4/023* (2013.01)
 USPC .................. 455/456.1; 455/456.2; 455/456.5

(58) Field of Classification Search
 CPC ..... H04W 12/00; H04W 12/06; H04W 12/08; H04W 12/12; H04W 12/02; H04W 4/023; H04W 4/04; H04W 64/00
 USPC ........... 455/456.1, 456.2, 456.3, 456.5, 456.6
 See application file for complete search history.

(56) References Cited

U.S. PATENT DOCUMENTS

| | | | |
|---|---|---|---|
| 6,556,819 B2 | 4/2003 | Irvin | |
| 7,000,116 B2 | 2/2006 | Bates et al. | |
| 7,835,721 B2 | 11/2010 | Tuulos et al. | |
| 8,311,513 B1* | 11/2012 | Nasserbakht et al. | ........ 455/410 |
| 8,396,489 B2 | 3/2013 | Platt et al. | |
| 8,396,490 B2 | 3/2013 | Platt et al. | |
| 2006/0049925 A1* | 3/2006 | Hara et al. | ..................... 340/435 |
| 2007/0032225 A1 | 2/2007 | Konicek et al. | |
| 2008/0107274 A1* | 5/2008 | Worthy | ......................... 380/278 |
| 2008/0305766 A1 | 12/2008 | Falk | |
| 2009/0170532 A1 | 7/2009 | Lee et al. | |

(Continued)

OTHER PUBLICATIONS

"Idea: Location Based Security Lock—MacRumors Forums," located at http://forums.macrumors.com/showthread.php?t=730772;Jun. 23, 2009; last visited on Apr. 30, 2012, 3 pages.

(Continued)

*Primary Examiner* — Jean Gelin
(74) *Attorney, Agent, or Firm* — Kilpatrick Townsend & Stockholm LLP

(57) ABSTRACT

The security level and/or other device behavior, configurations, or settings on a mobile device can be modified based on the location of the mobile device. The location of the mobile device can be determined by analyzing location aspects present at a location, where any parameters or attributes of a location that can assist in identifying a particular location may be used as location aspects. In a setup process, the mobile device identifies available aspects at a location and can use the available aspects to determine a location context associated with a location. In a use example, the device identifies available aspects at a location and determines whether the available aspects match a previously defined location context. If the available aspects match the previously defined location context, device behavior, configurations, or settings on a mobile device can be modified.

25 Claims, 12 Drawing Sheets

(56) References Cited

U.S. PATENT DOCUMENTS

| | | |
|---|---|---|
| 2009/0186633 A1 | 7/2009 | Yonker et al. |
| 2011/0252464 A1 | 10/2011 | Sanjeev |
| 2012/0172050 A1* | 7/2012 | Ledlie et al. ............... 455/456.1 |

OTHER PUBLICATIONS

PoKos Communications Corp, protest pursuant to 37 CFR 1.291 in respect of U.S. Appl. No. 13/731,893, mailed Jul. 3, 2014, 4 pages.

* cited by examiner

| Location context for "Home" | | |
|---|---|---|
| Aspect | Primary | Secondary |
| GPS +/- 100 m of home address | X | |
| "Neighbor Wi-Fi" visible | | X |
| Second mobile device detected via short-range wireless communication | | X |
| Connected to wireless access piont maintaining "My Home Network" Wi-Fi | X | |
| Estimated distance from access point < 50 m | X | |
| Challenge on network: "My Desktop" connected to "My Home Network" | | X |
| Challenge on network: "My Desktop" connected to Bluetooth input devices | | X |
| Challenge on the network: "My TV" connected to "My Home Network" | | X |
| Challenge on the network: "My TV" connected to wireless speakers | | X |
| Environment signature | | X |

FIG. 1B

|  | *Location context 1* | *Location context 2* | *Location context 3* |
|---|---|---|---|
| GPS coordinates | Within 100 m of home address | — | Within 500 m of work address |
| Visible network | "Neighbor Wi-Fi" | — | — |
| Connected network | "Home Airport Express" | — | "Work Wi-Fi" |
| Devices on Network | "My iMac" | — | — |
| Visible Bluetooth | — | — | — |
| Paired Bluetooth | "My BT speakers" | Car Audio System | — |
| Physical connection | — | Car USB | — |
| Environmental signature | — | Audio signature | — |

FIG. 5B

|  | Location associated with location context | Security level for modified security location |
|---|---|---|
| Location context 1 | Home | Decrease security requirement |
| Location context 2 | Car | Decrease security requirement |
| Location context 3 | Work | Increase security requirement |
| All other locations |  | Baseline security |

FIG. 5C

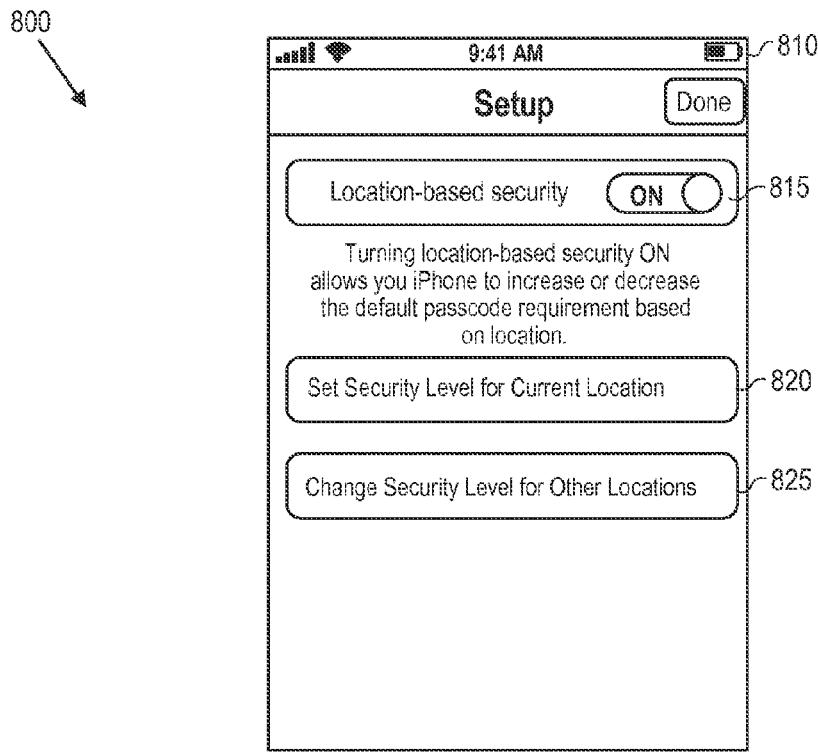
FIG. 8A
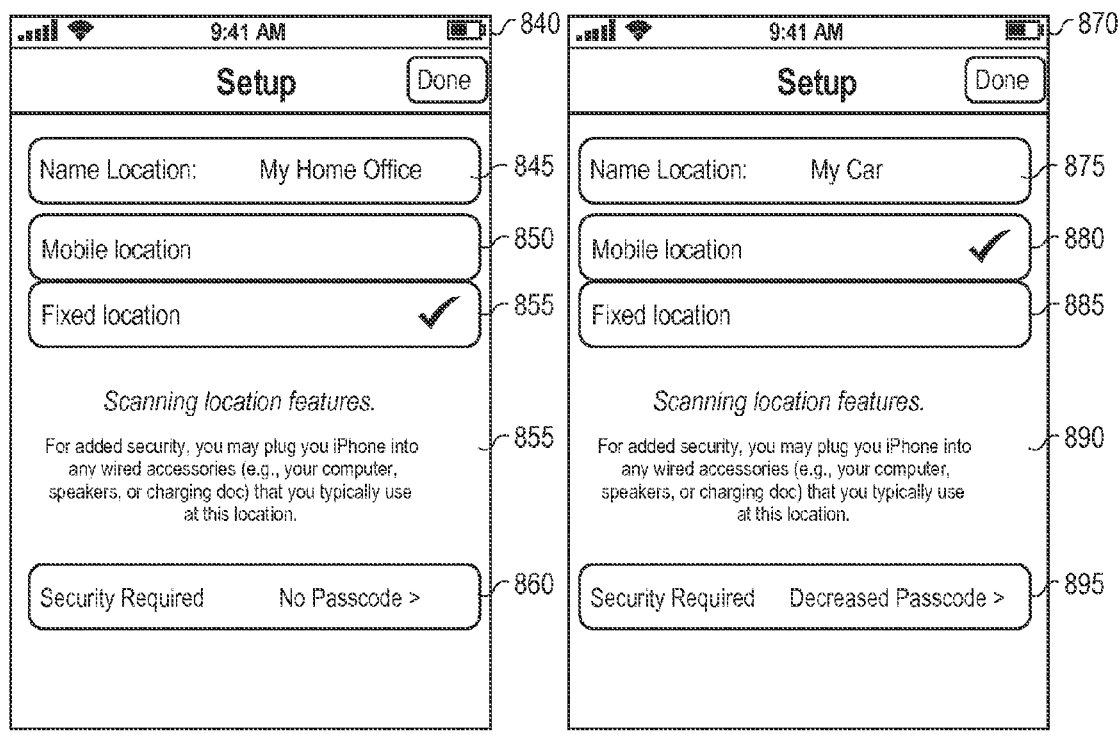
FIG. 8B
FIG. 8C

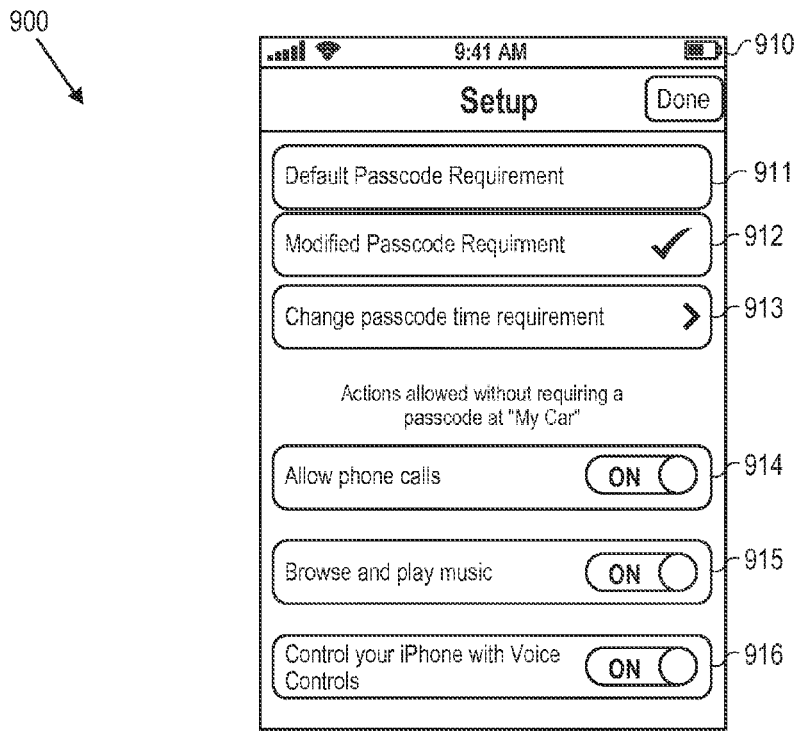
FIG. 9A
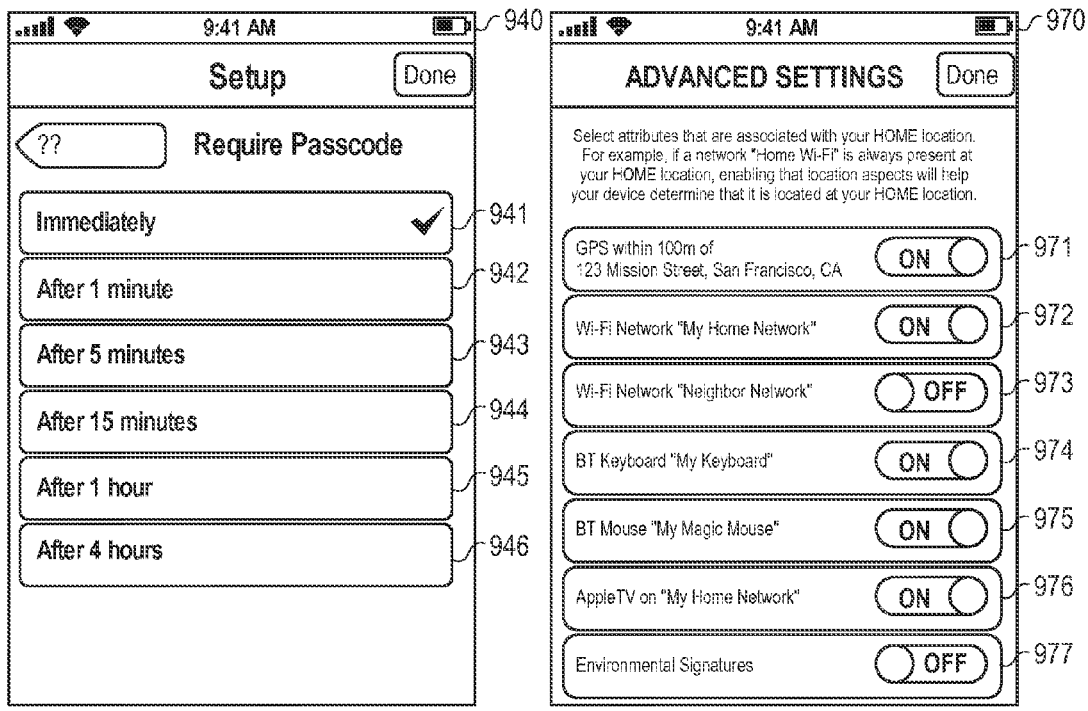
FIG. 9B
FIG. 9C

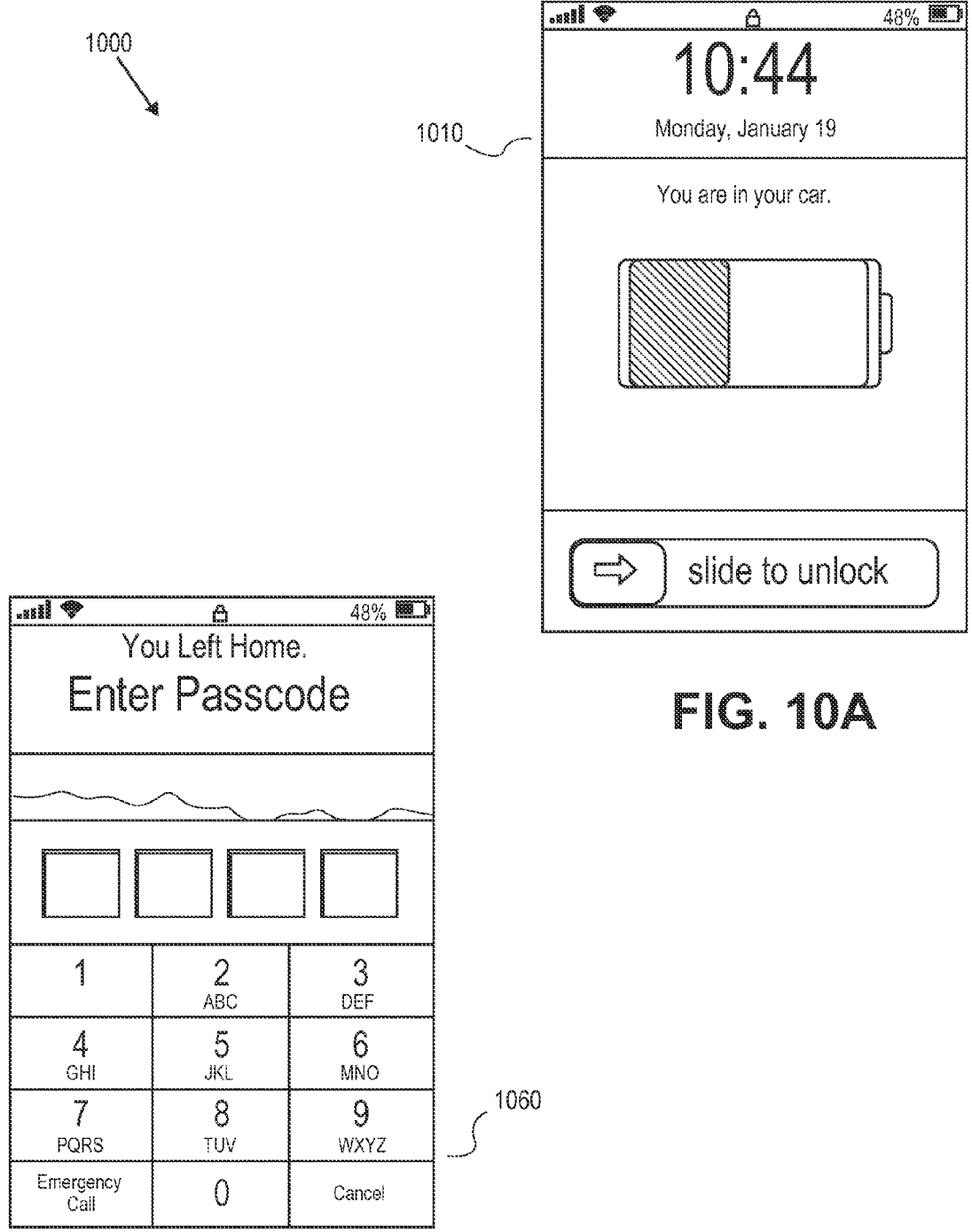

LOCATION-SENSITIVE SECURITY LEVELS AND SETTING PROFILES BASED ON DETECTED LOCATION

BACKGROUND

The present disclosure relates generally to location services and in particular location-sensitive security levels and setting profiles based on detected location.

Mobile devices, such as smart phones, tablet computers, media players, and the like, have become ubiquitous. People are ever more reliant on mobile devices for their day-to-day activities. Often, sensitive or private information is accessible from mobile devices. Mobile devices can also be used to make purchases from online and brick-and-mortar merchants. Users may want to limit the use of their mobile devices by unauthorized individuals, such as children or other third parties. To prevent against unauthorized access, mobile devices often have security requirements for authentication.

One example of a security requirement is a password or passcode. For example, a passcode requirement can be enabled on an iPhone® commercially available from Apple Inc. When enabled, a passcode may be required immediately upon the iPhone entering a lock-screen state or after a predetermined time of inactivity (e.g., 1 minute, 5 minutes, 15 minutes, 1 hour, etc.). Shorter times are typically more secure. There may be different types of passcodes. For example, the passcode can be a simple 4-digit numerical password or a longer alphanumeric password. Longer passcodes with a combination of characters and special characters are typically more secure. However, longer and more complex passcodes are more difficult for a user to enter. Frequent or unnecessary requests to the user for authentication can be burdensome and harm the user experience.

SUMMARY

To provide a reliably pleasant and secure experience for a user operating a mobile device, it can be desirable to modify security settings or other device behavior based on a detected location. Mobile device users often frequent the same locations. Mobile devices can be configured to detect the current location. Based on the detected current location, the mobile device can modify settings and configurations. Security settings are one example of device behavior that can be modified in accordance with embodiments of the present invention.

Mobile devices often have security requirements, such as passwords or passcodes. Security requirements help ensure that a mobile device is in the hands of the appropriate party. Often the security level remains the same regardless of the location of the mobile device. Because some locations may be inherently more secure, such as a user's home or office, these locations may be considered "safe" and require less stringent security. It can be desirable to have decreased security requirements when the mobile device is at a secure location. Conversely, some locations may be considered higher risk or "unsecure." In these locations, it can be desirable to implement stronger security protections. When the mobile device is in an unsecure location (e.g., public location such as cafes or shopping centers), security requirements can be increased.

A mobile device can detect a current location and implement security settings that correspond to the detected location. The current location may be detected by analyzing location aspects, where a "location aspect" can include any parameter or attribute that assists in determining a location of a mobile device, including: geographic location coordinates; connected or visible networks and devices; characteristics of devices or networks that are visible to the mobile device; the presence of other devices nearby; physical connection to other devices; environmental characteristics of the location; or other features of the location.

The collection of location aspects that is present (or not present) at a particular location may be referred to as a "location context." That is, a location context can be the set of location aspects that is present (or not present) at a given location. For example, a location context associated with a user's home may include a first location aspect (being connected to "My Home Network") and a second location aspect ("My iMac" visible on that network). When the mobile device detects the first location aspect and the second location aspect, the mobile device has identified a location context location with a threshold confidence. Based on that identification, the mobile device can deter nine if a location (e.g., home) is associated with that location context and implement a modified security level.

Some embodiments determine a location based on combinations of location aspects, such as primary network and secondary network, primary network and GPS location, primary network and secondary network and GPS location, Bluetooth device and GPS location, Bluetooth device and primary network, or any other suitable combination. Using a combination of aspects can increase the confidence that the location is correctly identified. Distance between the mobile device and other devices can also be relied upon as a location aspect. For example, an area may be considered safe if within a predetermined distance (e.g., 100 m radius) of another device e.g., access point servicing a specific network).

According to some embodiments of the present invention, the security level required on a mobile device can vary based on information indicative of the mobile device's location (i.e., location aspects or a location context). In some embodiments, a mobile device can implement a baseline security level, which has a default security requirement. The mobile device detects a "safe" or "unsecure" location for decreased or increased security by detecting whether various location aspects are available or unavailable and other information associated with particular aspects. Based on the detected location aspects, the mobile device can determine a first location context of the mobile device. The first location context is associated with a first location for modified security, for example, by looking up the first location context in a file or table that contains corresponding locations for modified security. Based on the detected location, the mobile device implements a first security level based on the first location context. In some embodiments, the first security level can be an increased security level relative to the baseline level. In some embodiments, the first security level can be a decreased security level relative to the baseline level.

In some embodiments, location-based security is set up and initialized. A mobile device can receive an instruction to set up a modified security level associated with a first location. The instruction can be received via a user interface and can include a selection of the modified security level to be implemented. The first location can be the current location of the device at the time of setup. In response to the instruction, the mobile device can analyze the available location aspects at the first location and determine a location context. The mobile device can select one or more available aspects to associate with the first location. The mobile device can then assign the modified security level to the first location.

In some embodiments, a mobile device can include control logic configured to implement a first security level, detect one or more location aspects available at a current location of the mobile device, determine a location context based on the one or more location aspects detected, and determine whether the location context is associated with a location for modified security. If the location context is associated with a location for modified security, the control logic is further configured to implement a second security level at the location for modified security. If the location context is not associated with a location for modified security, the control logic is configured to continue to implement the first security level.

The following detailed description together with the accompanying drawings will provide a better understanding of the nature and advantages of the present invention.

BRIEF DESCRIPTION OF THE DRAWINGS

FIG. 1B shows a table of primary and secondary aspects that can make up a location context according to an embodiment of the present invention.

FIGS. 5B and 5C are simplified tables of location aspects at certain locations and information for correlating location contexts to security levels, respectively, in accordance an embodiment of the present invention.

FIG. 8A illustrates a user interface for setting up location-based security in accordance with certain embodiments of the present invention. FIGS. 8B and 8C illustrate user interfaces for configuring location-based security in accordance with certain embodiments of the present invention.

FIGS. 9A and 9B illustrate various user interfaces for setting up location-based security in accordance with certain embodiments of the present invention. FIG. 9C illustrates a user interface for advanced settings in accordance with certain embodiments of the present invention.

FIGS. 10A and 10B are diagrams of embodiments of various user interfaces according certain embodiments of the present invention.

DETAILED DESCRIPTION

A mobile device can detect a current location and implement device behavior (e.g., security settings) that corresponds to the detected location. For example, the mobile device can detect a current location using GPS. Based on the GPS coordinates, the mobile device can set or initialize device settings and configurations that are specific to the detected location. The mobile device may detect the current location in other ways, including analyzing features that are present at the location (e.g., available networks, devices on the network, proximate devices, environmental sensors, etc.).

Once a location is detected, the mobile device can determine whether the device behavior should be modified. One example of a device behavior that can be modified based on detected location is security behavior. In some embodiments, mobile devices that implement some form of user authentication can use detected features to ease (or increase) the authentication requirements at specific locations.

In one example, a passcode is not required when the mobile device detects a current location corresponding to the user's home. In another example, a simple passcode is used when the mobile device detects a location corresponding to the user's office desk, but a longer or more complex alphanumeric passcode is used at other locations within the office, such as the cafeteria or conference rooms. In yet another example, a default location setting applies to any location that does not have specific security levels set (e.g., outside the designated home or office locations). The term "location-based security" refers generally to security levels that change based on the location of a mobile device.

There are many advantages to location-based security. A security system that has one security level implemented regardless of location may be less secure. Some locations may be more secure and other locations less secure resulting in overzealous security measures or insufficient security measures. Frequent authentication requests may cause a user to choose a weak and unsecure passcode (e.g., 1-2-3-4). Moreover, a security system that has one security level implemented regardless of location may harm the user experience. For example, the user may be frustrated by being repeatedly prompted for passwords/passcodes when the user finds it unnecessary or burdensome. Certain embodiments of the present invention may assist in balancing the need for security and the user experience by enabling the device to request authentication that is tailored to the likelihood of a security risk.

Figure 1A:
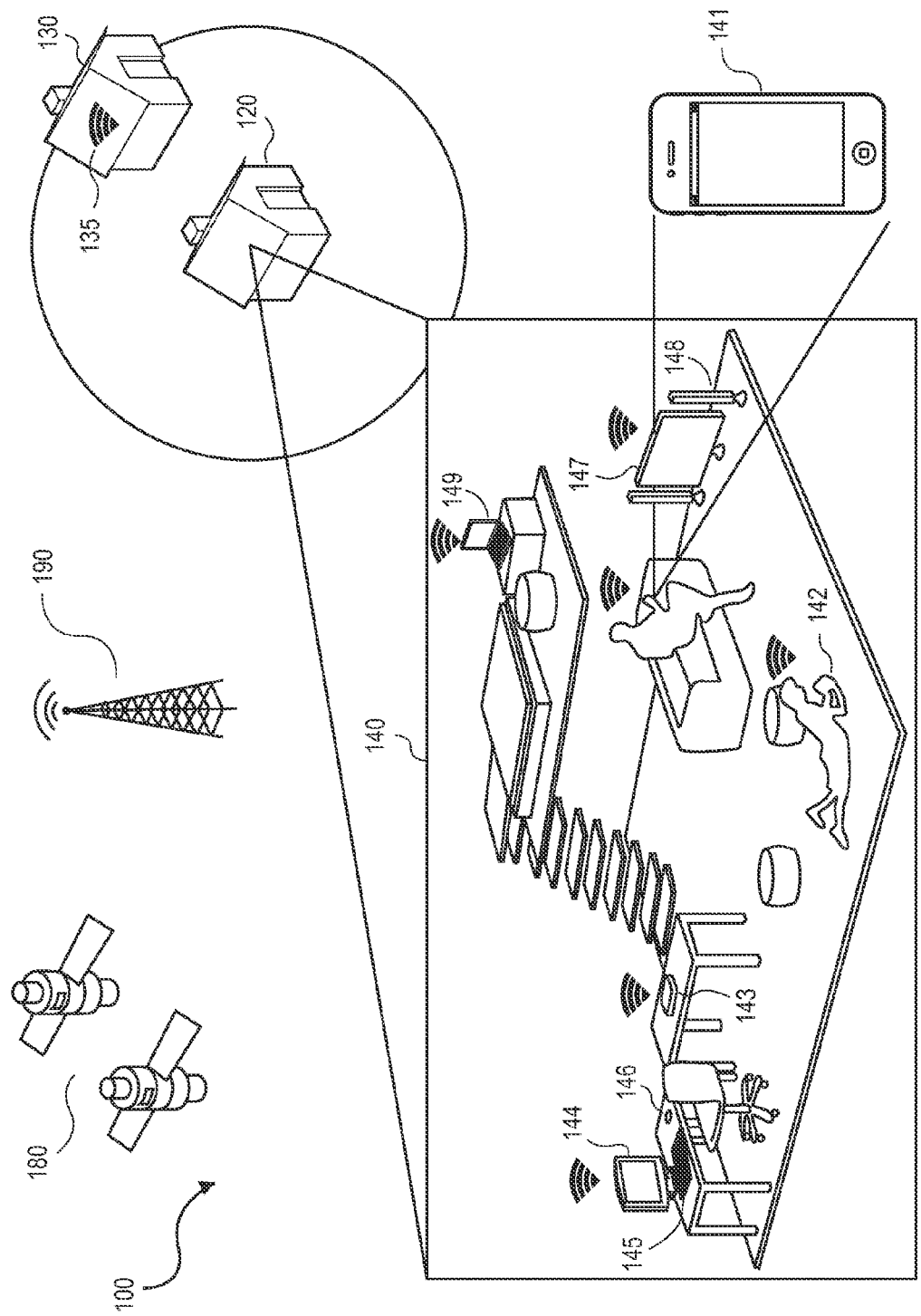
FIG. 1A shows a system, including a mobile device, according to an embodiment of the present invention.

FIG. 1A is a diagram of a system 100 at a fixed location according to an embodiment of the present invention. Various electronic devices can be located in a structure 120, such as a house, building, room, or other location that the user frequents. For illustration purposes, the electronic devices are shown in a home environment 140. However, it is understood that the same principles can apply to other environments. In some embodiments, one or more devices or networks are located in structure 120. Other devices or networks may be located in a nearby building or structure 130. The nearby structure may, for example, be a neighbor's house or an adjacent office. Devices or networks from the nearby building or structure 130 may be detected by a mobile device 141 in structure 120. System 100 may also include global positioning systems 180 (GPS) and cellular base stations 190.

Environment 140 may include various electronic devices such as a first mobile device 141, a second mobile device 142, access point 143, computer 144, keyboard 145, mouse 146, a connected television or smart TV 147, speakers 148, computer 149, set top boxes (not shown), printers (not shown), remote controls (not shown), etc. Electronic devices can have unique device identifiers or other attributes that may identify a particular device, including MAC addresses, supported services/protocols, available ports, ports in use, etc. The unique identifier can be associated with a device name for ease of use.

The devices can communicate with one another. Electronic devices can include one or more communication interfaces for communicating with networks or other devices, including interfaces for wired communication, Wi-Fi, Bluetooth, near field communication (NFC), infrared communication, cellular phone calls, cellular data, or the like. For example, computer 144 can communicate with TV 147 through access point 143. Electronic devices, such as devices 141-149, can further include any suitable electronic components including processors, controllers, memory, peripheral interfaces, software modules (or sets of instructions), and input/output modules.

In some embodiments, the electronic devices, such as devices 141-149, can be connected to one or more wired or wireless networks (not shown). In some embodiments, mobile device 141 can detect a network while not actually connecting to the network (e.g., "Neighbor Network" 135 in structure 130). The networks can be identified by name, Service Set Identifier (SSID), or other unique identifier. Any such network can be coupled to one or more other devices, including computers (e.g., desktop computer 144, a connected television 147, speakers 148, laptop computer 149, set top boxes (not shown), printers (not shown), and mobile devices (141 and 142). For example, mobile device 141 and computer 144 can be in operative communication with wireless access point 143 maintaining a wireless network (e.g., "My Home Network"). Various attributes may be associated with wireless networks, including SSID, base station identifier (BSID), received signal strength indicator (RSSI), channel number, security policy (YES/NO/TYPE), or the like.

The electronic devices can be connected to the interact or similar network. A modem, such as a DSL modem, cable modem, or the like, can be used to connect to the Internet. The connection to the interact may have various attributes. For example, the modem can be associated with an IP address or other unique identifier.

In some embodiments, one of electronic devices 141-149 can be connected to another of the electronic devices directly using short-range wireless connections (e.g., Bluetooth, NFC, or infrared technologies) without using an intermediate network. For example, computer 144 can have connections to peripherals, such as keyboard 145 and mouse 146. In another example, television 147 can be connected to Bluetooth speakers 148. In some embodiments, the mobile device can detect the presence of another device while not actually pairing or connecting with it. In some embodiments, one of the electronic devices 141-149 can communicate with (or detect) another of the electronic devices using a combination of a wired or wireless network and a direct connection between two devices. For example, mobile device 141 can be able to detect that computer 144 is connected to a wireless keyboard 145 or wireless mouse 146.

Focusing now on mobile device 141, the security level (or other device setting) can be modified based on the detected location of mobile device 141. The location of mobile device 141 may be detected based on detected location aspects of the device, e.g., what is visible or connected to the mobile device, or other features of the location. The term "location aspect" or "aspect" can include any parameter or attribute that can assist in determining a location of a mobile device. Location aspects can include many features or attributes of a location, including networks that are visible to the mobile device, networks that the mobile device is able to connect to, devices that are visible on a particular network, or challenge/response on the network. For example, a home Wi-Fi network may help define a "home" location. In another example, a printer on the home Wi-Fi network may help define a "home" location. The collection of location aspects that are present (or not present) at a particular location may be referred to as a location context.

FIG. 1B illustrates a table of an example location context for "home" that can be detected by mobile device 141 according to one embodiment of the present invention. The location context can use geographic position (e.g., latitude and longitude) as a location aspect. The geographic position may be provided by location technologies such as GPS, location, or cellular location. For example, a GPS position within a predetermined distance (e.g., 100 m) from a specific address (e.g., home address) can be a location aspect. The predetermined distance may be provided by the user or may be a default value. The address (or other geographic position) may be provided by the user or determined by the mobile device as part of an initialization process.

The location context can use visible networks as a location aspect; e.g., mobile device 141 can detect "Neighbor's Wi-Fi" 135. The presence of the network or device, regardless of whether a connection exists, can be used as an aspect to define a location context. Any attribute of a wireless network, including attributes that are visible over the air to a device that has not connected with or joined the network, can be used as a location aspect. For example, SSID, BSID, RSSI, channel number, security policy, etc., may be visible for a wireless network. Each of these attributes can be used by a mobile device as a location aspect.

The location context can use other nearby devices detected using short-range communication as a location aspect. For example, mobile device 141 can detect presence of mobile device 142 using Bluetooth, and this detection can be used as a location aspect. Many other possibilities exist to detect proximately located devices in a system such as system 100 (FIG. 1A).

The location context can use connections or lack of connection to particular networks as a location aspect. For example, mobile device 141 can connect with "My Home Network" Wi-Fi maintained by access point 143. Upstream attributes of the network connection (e.g., IP address of modem) can be used as location aspects in accordance with the present invention. For example, an aspect can specify that a particular access point is connected to a particular modem that is connected to a particular IP address, and, if one or more of these conditions are not true, then the aspect as a whole is considered not present. Multiple layers of aspects can make it more difficult to spoof a location. Again, other attributes of the connected network may be used including SSID, BSID, RSSI, channel number, security policy and the like.

Estimated distance from between mobile device 141 and other devices can be used as a location aspect. For example, a location aspect may include a threshold maximum distance from access point 143 as estimated using a distance calculating technology. The distance between devices can be estimated using, for example, RSSI or a time of flight calculation. Time of flight calculations can use any suitable technology, including ultrasound, infrared, optical, etc. For example, a location aspect can include a threshold distance (e.g., 100 m, 500 m, etc.) to an access point in a scenario where a user would prefer modified security only when relatively close to the access point (perhaps located near a desk). For example, in a corporate work environment, there can be many base stations supporting a large corporate Wi-Fi network. A user may want to implement location-based security near the user's desk or cube. The mobile device can set the closest 5 access points broadcasting on a particular channel as location aspects and/or require a RSSI above a predetermined threshold for one or more of those access points.

The location context can use various challenges and responses on a network (e.g., "My Home Network" Wi-Fi) as a location aspects. That is, mobile device 141 can send queries to other devices and evaluate the response. For example, mobile device 141 can issue a challenge that inquires whether "My Desktop" (e.g., 144) is connected to "My Home Network." That particular location aspect can be considered satisfied if it is determined that "My Desktop" (e.g., 144) is connected to "My Home Network." In another example, mobile device 141 can issue a challenge that inquires whether "My Desktop" (e.g., 144) is connected to a Bluetooth input device (e.g., keyboard 145 and/or mouse 146). That particular location aspect can be considered satisfied if it is determined that "My Desktop" (e.g., 144) is connected to a Bluetooth input device (e.g., keyboard 145 and/or mouse 146). In this example, knowing that computer 144 is connected to keyboard 145 and/or wireless mouse 146 can give further confidence to mobile device 141 that mobile device 141 is at a particular location. In another example, mobile device 141 can issue a challenge that inquires whether "My TV" (e.g., 147) is connected to "My Home Network." That particular location aspect can be considered satisfied if it is determined that "My TV" (e.g., 147) is connected to "My Home Network." Other challenges and responses may be used as location aspects and the examples above are for illustration only. For example, challenges/responses could inquire about further details of devices in addition to device name or identifier (e.g., MAC address), including supported services/protocols, available ports, ports in use, etc.

The location context can include signatures of the environment that are detectable by sensors on mobile device 141. The sensors can detect sounds, light, motion, pressure, temperature, vibration, and the like that are unique to or indicative of the location. In some embodiments, light emitted within a particular room can have a unique signature or characteristic. In some embodiments, an auditory signature can be detected by the audio circuitry. In some embodiments, a location aspect can be an audio level of less than (or greater than) a threshold decibel level. For example, a loud environment is more likely to be a public environment in which the mobile device is more prone to theft or security breaches. Other environment location aspects may be used and the examples above are for illustration only.

In the embodiment illustrated in FIG. 1B, the location context includes several primary aspects and several secondary aspects. "Primary location aspects" or "primary aspects" include aspects that are accessed first to determine whether the mobile device is at a particular location. In some instances, primary aspects may be associated with higher confidence levels. In some embodiments, after one of the primary aspects fails (e.g., is no longer present or visible), the device may immediately return to the baseline security level. A set of aspects associated with the location may also include a subset of secondary aspects. "Secondary location aspects" include aspects that are indicative of a location but are associated with lower confidence levels and/or are more easily faked or spoofed by an intruder than primary aspects. In some embodiments, secondary aspects are considered after at least one primary aspect has been identified. In some embodiments, after one of the secondary aspects fails, the device may remain at the modified security level provided that other primary and secondary aspects provide threshold confidence in location.

For example, primary aspects can include a GPS location within 100 m of the user's home address, connection to an access point (e.g., access point 143) maintaining a particular network (e.g., "My Home Network" Wi-Fi), and a threshold maximum distance from the access point as estimated using a distance calculating technology. Secondary aspects may include visible networks (e.g., "Neighbor's Wi-Fi" 135), a second mobile device detected via short-range communication (e.g., Bluetooth connection to mobile device 142); various challenge/responses on the network to determine whether certain devices are in operative communication with the network, and environmental signatures (e.g., a unique seismic signature).

Figure 2:
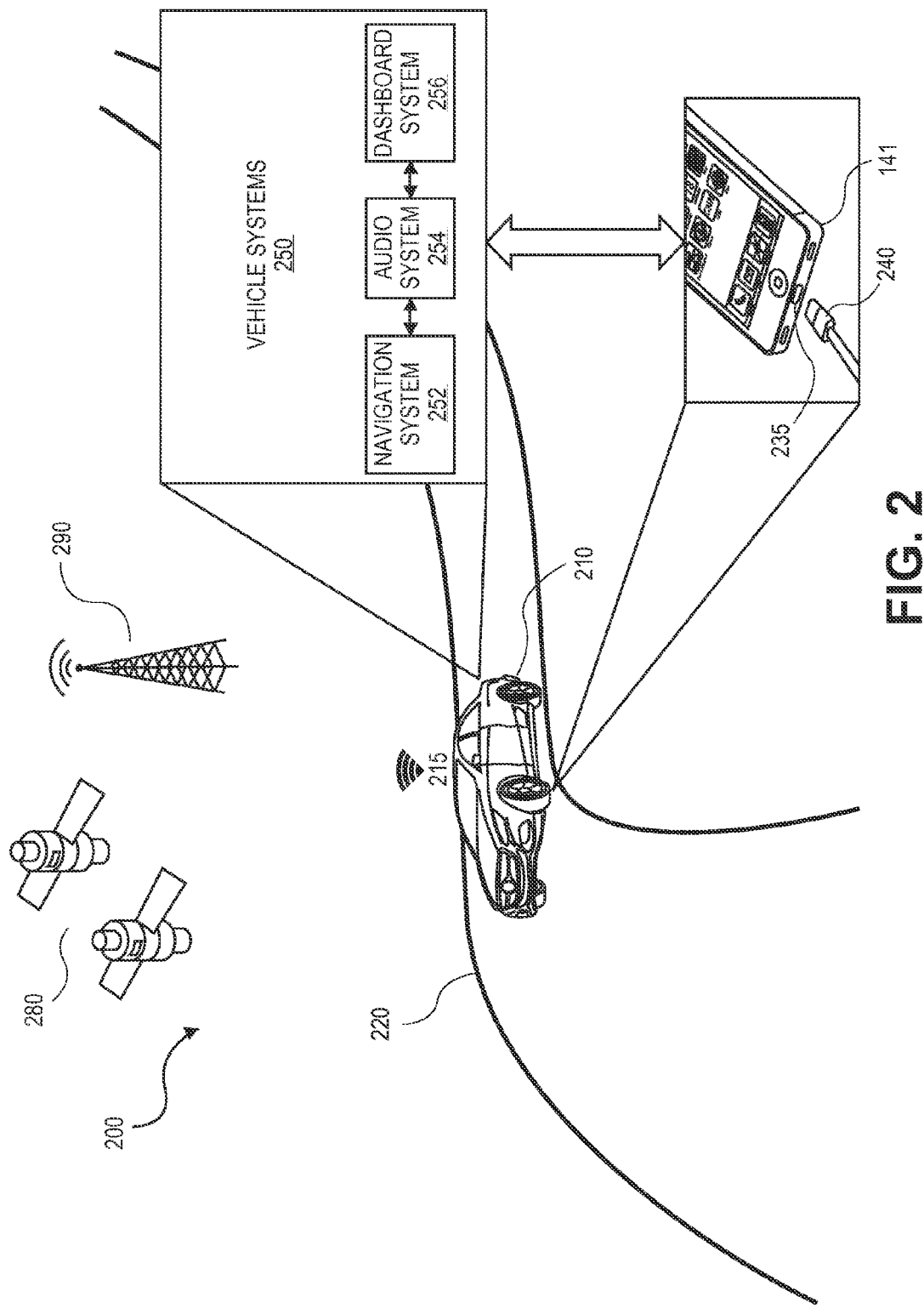
FIG. 2 shows a system, including a mobile device, according to an embodiment of the present invention.

In some embodiments, the "location" of a mobile device need not refer to a fixed location (such as a home or office) but can also include a location that is mobile, such as when the mobile device is inside of a moving vehicle. FIG. 2 illustrates a system 200 according to an embodiment where the location is mobile, in this case the user's car 210. When a mobile device is at a mobile location, such as inside car 210, it may be desired to have the device behave in a certain way (e.g., decreased security requirements). Similar to fixed locations described above, mobile locations can have aspects that indicate location. When certain aspects are present, the mobile device can determine that the mobile device is located at a given mobile location.

System 200 may include a vehicle 210, a mobile device 141, and vehicle systems 250. Vehicle 210 can be a car, bus, train, airplane, boat, or the like. Vehicle 210 may follow a defined path 220, such as a road. Vehicle 210 may include a wired or wireless network 215 and vehicle systems and subsystems 250. Vehicle systems 250 can include a navigation system 252, an audio system 254, a dashboard/engine system 256, etc. For conciseness, these systems will not be described in detail. Vehicle systems 250 can be coupled to a vehicle control system. Each of the vehicle systems and the control system can have a unique identifier. When in communication with vehicle 210, the mobile device can determine when one or more of these systems are present using the unique identifiers. Vehicle systems and subsystems can be visible to a mobile device in communication with vehicle 210. In some embodiments, vehicle systems and subsystems can communicate vehicle system/subsystem identification data to a mobile device.

Mobile device 141 can include one or more wired and wireless communication interfaces for communicating with networks or devices. In some embodiments, mobile device 141 can be physically connected to vehicle 210 and vehicle systems 250. Mobile device 141 can have a port 235 for power, charging, and communicating data. A connector 240 (or docking station) can be coupled to a vehicle system. Connector 240 can be used to connect mobile device 141 and vehicle 210 through port 235. In some embodiments, mobile device 141 can be wirelessly connected to vehicle 210 and vehicle systems 250, for example, using Bluetooth, NFC, infrared communication, or the like.

Mobile device 141 can incorporate cellular telephone technology to communicate with a cellular tower 290 for voice calls and/or cellular data. The mobile device may incorporate global positioning satellite (GPS) technologies, e.g., using signals received from satellites 280 to determine location information representative of the location of the mobile device. Other details of mobile device 141 are described with reference to FIG. 4 below.

In some embodiments, the security level (and/or other device settings) on mobile device 141 can vary based on the device's location and/or what is proximate to the device. In the embodiment shown, mobile device 141 can detect aspects that are associated with vehicle 210. These aspects can include physical connections (235/240) or wireless connections between vehicle 210 and mobile device 141. The aspects can also include connections or communications between mobile device 141 and the vehicle systems. Although not shown, other devices or networks can be present in vehicle 210, and those devices or networks can be used as aspects that define a location context.

In the mobile location context, GPS or other geographic location data may be less useful as location aspects because the absolute position (e.g., latitude and longitude) of the mobile device can change while the device remains in the same mobile location (e.g., a mobile device in a moving car). Accordingly, in some embodiments, GPS or other geographic location data can be disregarded in the context of a mobile location. However, in other embodiments, GPS or other geographic location data can be used.

In some embodiments, the threshold range of the GPS or other geographic location data can be increased. For example, a location aspect can be GPS-determined coordinates within 50 miles (or some other radius) of a fixed base position. In this manner, in combination with other location aspects, device security levels can be modified when in a vehicle and within a predetermined distance of a particular location.

In some embodiments, the location may be a hybrid fixed-mobile location. An example of a hybrid location can be a bus on a fixed route, such as a commuter bus that travels the same route. The entirety of the bus route would be a "fixed location" (e.g., fixed along the path of I-280 between Cupertino and San Francisco), but the bus itself would be a "mobile location" (e.g., connected to "Apple Coach Wi-fi" network access point located on Apple coach). Historical user data may be used to determine locations that are safe. For example, initially the mobile device may associate a mobile Wi-Fi network (e.g., Apple Coach Wi-Fi) with a safe location. Using historical data, the mobile device can determine whether GPS coordinates obtained while connected to the mobile Wi-Fi network also correspond to a safe location (e.g., the usual route of the bus) or an unsafe location (e.g., clearly off the usual route). The mobile device may use this feedback mechanism to improve the recognition of secure and unsecure locations.

Figure 3:
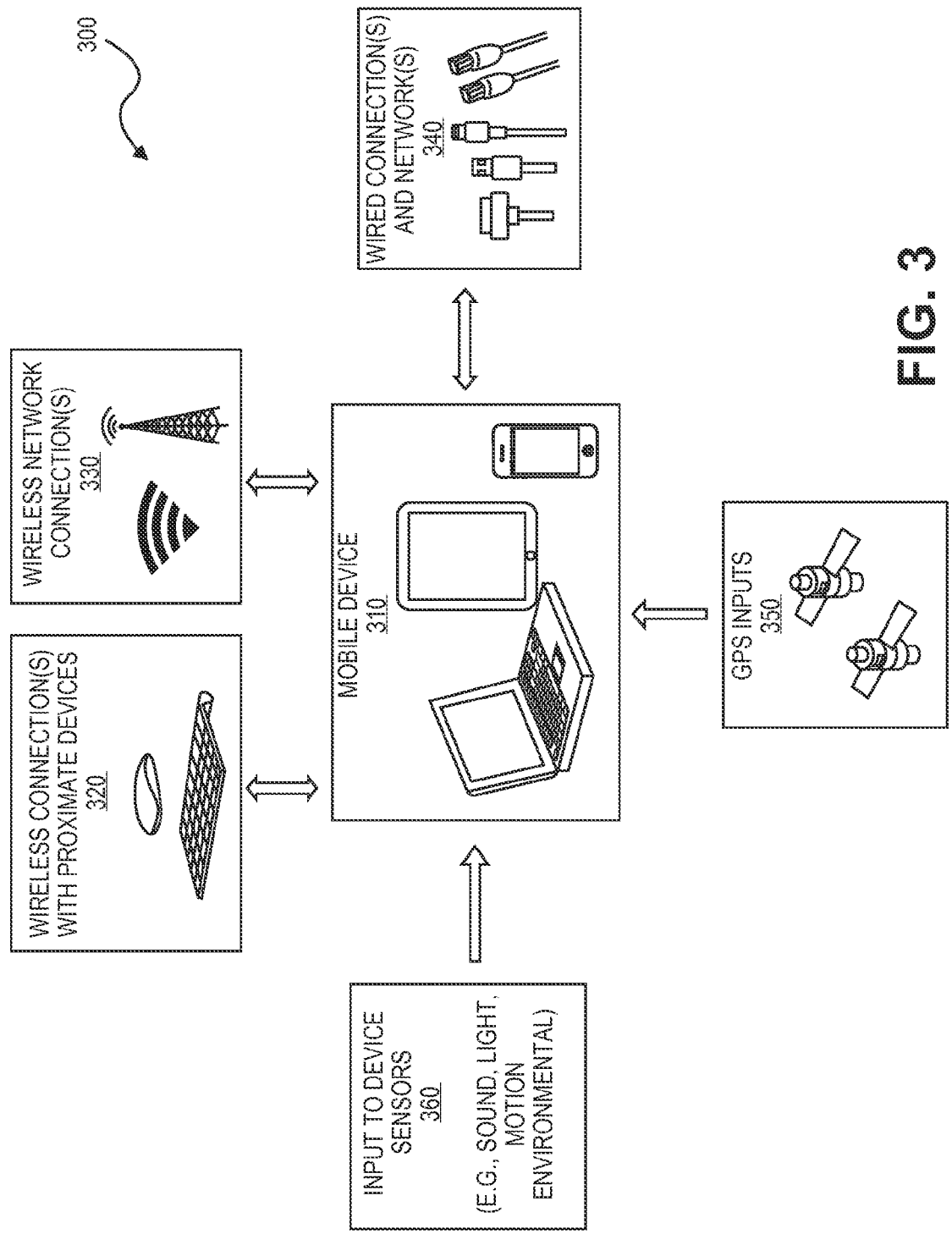
FIG. 3 is a simplified block diagram of a system, including a mobile device and location aspects, according to an embodiment of the present invention.

FIG. 3 is a high-level block diagram 300 of mobile devices and location aspects that can be detected by the mobile devices according to an embodiment of the present invention. According to some embodiments of the invention, a mobile device 310 can modify device behavior, such as security settings, based on location aspects that are detected or not detected.

Location aspects can include presence or absence of wireless connections with proximate devices 320. A wireless connection can connect mobile device 310 to a proximate device. A proximate device is a device that is near mobile device 310 such that short-range communications can be used between the devices. For example, the mobile device can establish communication with one or more devices, such as a wireless keyboard or mouse, using a suitable wireless technology, such as Bluetooth. The proximate device may have a unique device identifier. The unique identifier can be transmitted from proximate device 320 to mobile device 310. In some embodiments, the mobile device can detect a device without establishing communication. A Bluetooth device can have a unique device ID and a pairing code. A location aspect can include whether a Bluetooth device, with which the mobile device has been previously paired, is visible to the mobile device.

Location aspects can include connections to wireless networks 330. Mobile device 310 can establish communication with one or more wireless connections 330 using a suitable wireless technology, such as Wi-Fi using an access point. The network and access point can have unique device identifiers associated with each respective device/network. Other devices can be connected to the Wi-Fi network or access point. Devices hosted by the network can have unique device identifiers associated with each respective device. The Wi-Fi network or access point can be connected to various upstream devices and networks, such as a modem and internet service provider. The upstream devices can have unique device or network identifiers associated with them. For example, the modem can have a MAC address and the interact service provider can assign an IP address.

Location aspects can include one or more wired connections to other devices or connections to wired networks 340. Mobile device 310 can establish communication with one or more wired networks or devices 340. A wired connection to other devices can take any suitable form, including a connection made via a USB connector, 30-pin connector, Lightning connector, Thunderbolt connector, Ethernet cable, Firewire, or the like. The connected devices and networks can have unique device identifiers associated with each respective device/network. Other devices can be connected to the wired network or devices. Devices hosted by the wired network can have unique device identifiers associated with each respective device.

The unique device identifiers, described above, can be transmitted to mobile device 310. The device identifier can be associated with a location aspect for a particular location context. The device identifier can be correlated to a location for modified security in a file or look-up table. The file or look-up table can contain modified security levels or settings and can be stored in a non-volatile memory of the mobile device or be accessible to the mobile device from the cloud.

Location aspects can include GPS coordinates or other geographic location data derived from GPS satellites 350. Mobile device 310 can receive GPS data from satellites 350 and calculate a geographic location fix. The geographic location fix can be correlated with a location for modified device behavior, such as a modified security level.

Location aspects can include inputs to sensors 360 of mobile device 310. For example, mobile device 310 can include sensors, including microphones, light sensors, motion sensors, temperature sensors, pressure sensors, and the like. A particular location can have environmental features that are unique to the location or at least indicate that the device can be located at the particular location. The sensor can receive environmental data and the mobile device can determine a signature associated with the data. The signature can be correlated with a location for modified device behavior, such as a modified security level.

Figure 4:
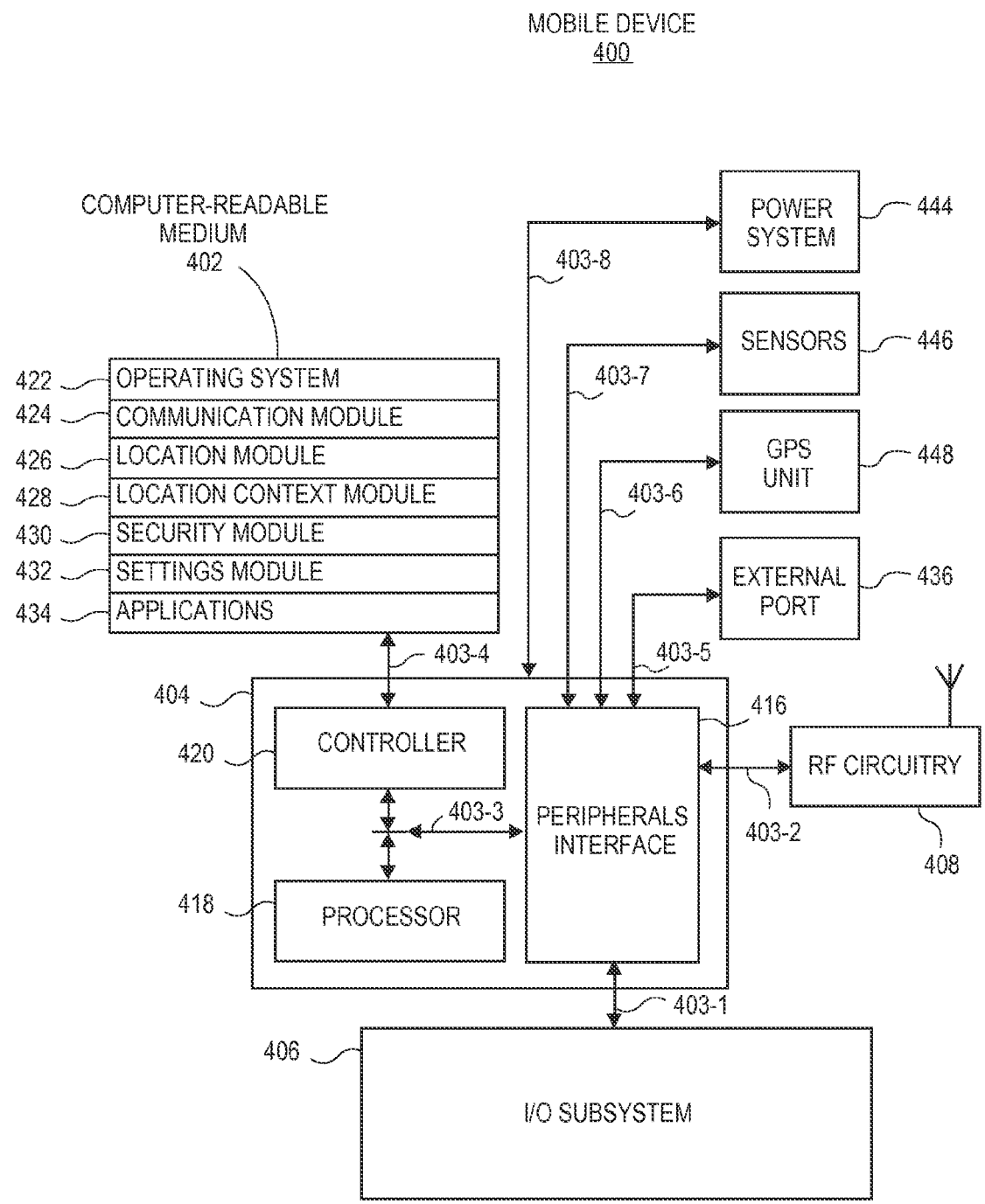
FIG. 4 is a simplified block diagram of a mobile device according to an embodiment of the present invention.

FIG. 4 is a block diagram of a portable electronic device or mobile device 400 according to an embodiment of the invention. Portable electronic device 400 generally includes computer-readable medium 402, a processing system 404, an Input/Output (I/O) subsystem 406, and radio frequency (RF) circuitry 408. These components may be coupled by one or more communication buses or signal lines 403. Device 400 can be any portable electronic device, including a handheld computer, a tablet computer, a mobile phone, laptop computer, media player, personal digital assistant (PDA) or the like, including a combination of two or more of these items.

It should be apparent that the architecture shown in FIG. 4 is only one example of an architecture for mobile device 400, and that device 400 can have more or fewer components than shown, or a different configuration of components. The various components shown in FIG. 4 can be implemented in hardware, software, or a combination of both hardware and software, including one or more signal processing and/or application specific integrated circuits.

RF circuitry 408 is used to send and receive information over a wireless link or network to one or more other devices' conventional circuitry such as an antenna system, an RF transceiver, one or more amplifiers, a tuner, one or more oscillators, a digital signal processor, a CODEC chipset, memory, etc. In some embodiments, RF circuitry 408 is capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, Wi-Fi (such as IEEE 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol, including communication protocols not yet developed as of the filing date of this document. A mobile device can include wireless circuitry that can communicate over several different types of wireless networks depending on the range required for the communication. For example, a short-range wireless transceiver (e.g. Bluetooth), a medium-range wireless transceiver (e.g., Wi-Fi), and/or a long range wireless transceiver (e.g., GSM/GPRS, UMTS, CDMA2000 1x/EV-DO and LTE/LTE-Advanced) can be used depending on the type of communication or the range of the communication.

RF circuitry 408 is coupled to processing system 404 via peripherals interface 416. Interface 416 can include conventional components for establishing and maintaining communication between peripherals and processing system 404. Voice and data information received by RF circuitry 408 (e.g., in speech recognition or voice command applications) is sent to one or more processors 418 via peripherals interface 416. One or more processors 418 are configurable to process various data formats for one or more applications programs 434 stored on medium 402.

Peripherals interface 416 couples the input and output peripherals of the device to processor 418 and computer-readable medium 402. One or more processors 418 communicate with computer-readable medium 402 via a controller 420. Computer-readable medium 402 can be any device or medium that can store code and/or data for use by one or more processors 418. Medium 402 can include a memory hierarchy, including cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs digital video discs). In some embodiments, peripherals interface 416, one or more processors 418, and memory controller 420 can be implemented on a single chip, such as processing system 404. In some other embodiments, they can be implemented on separate chips.

Mobile device 400 also includes a power system 444 for powering the various hardware components. Power system 444 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in portable devices.

In some embodiments, mobile device 400 includes sensors 446. Sensors can include accelerometers, temperature sensors, pressure sensors, audio sensors, light sensors, barometers, and the like. Sensors 446 can be used to sense location aspects, such as auditory or light signatures of a location. Any sensor that can detect environmental characteristic of a location can be used. In some embodiments, a light sensor is used to determine a light signature of a location. In some embodiments, an accelerometer can be used to determine a vibration (e.g., vibration of a car's motor) or seismic signatures of a location (e.g., a building's natural movement). Other sensors that can be used to determine environmental signatures can include chemical sensors, barometers, light sensors, etc.

In some embodiments, mobile device 400 can include a GPS receiver, sometimes referred to as a GPS unit 448. A mobile device can use a satellite navigation system, such as the Global Positioning System (GPS), to obtain position information, timing information, altitude, or other navigation information, During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 418 run various software components stored in medium 402 to perform various functions for device 400. In some embodiments, the software components include an operating system 422, a communication module (or set of instructions) 424, a location module (or set of instructions) 426, a location context module (or set of instructions) 428, a security module (or set of instructions) 430, one or more applications (or set of instructions) 432, and a user settings module (or set of instructions) 434.

There may be other modules or sets of instructions (not shown), such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

Operating system 422 can be any suitable operating system, including iOS, Mac OS, Darwin, RTXC, LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components.

Communication module 424 facilitates communication with other devices over one or more external ports 436 or via RF circuitry 408 and includes various software components for handling data received from RF circuitry 408 and/or external port 436. External port 436 (e.g., USB, FireWire, Lightning connector, 30-pin connector, etc.) is adapted for coupling directly to other devices or indirectly over a network (e.g., the Internet, wireless LAN, etc.).

Location module 426 can assist in determining the current position (e.g., coordinates or other geographic location identifier) of mobile device 400. Modern positioning systems include satellite based positioning systems, such as Global Positioning System (GPS), cellular network positioning based on "cell IDs," and Wi-Fi positioning technology based on a Wi-Fi networks. Typically, GPS is the most accurate, but often consumes more power than the other positioning systems. GPS also relies on the visibility of multiple satellites to determine a position estimate, which may not be visible (or have weak signals) indoors or in "urban canyons." In some embodiments, location module 426 receives data from GPS unit 448 and analyzes the signals to determine the current position of the mobile device. In some embodiments, location module 426 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at RF circuitry 408 and is passed to location module 426. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for mobile device 400 based at least in part on the position coordinates of the corresponding transmitters. Regardless of the specific location technology used, location module 426 receives information from which a location fix can be derived, interprets that information, and returns location information, such as geographic coordinates, latitude/longitude, or other location fix data.

Location context module 428 can analyze location aspects to determine a location context. That is, the location context module determines whether one or more location aspects are present at (or absent from) a particular location. After analyzing the location aspects, the location context module determines whether or not a location context is recognized with threshold confidence. If a location context is recognized by the location context module, then a security level can be modified by security module 430 or settings/configurations can be modified by settings module 432.

Security module 430 can determine what level of security is required to use the mobile device or access data based on the detected location. For example, the security module can have a file or look-up table on the mobile device or accessible to the mobile device from the cloud. The file or look-up table can list modified security locations correlated with security levels. For example, security module 430 may access a file with information similar to the tables illustrated in FIGS. 5B and 5C.

Settings module 432 can determine the settings or configuration of the mobile device. Users may want their devices to behave differently at various locations that they frequent on a regular basis. Mobile devices may be used at different locations with different purposes or objectives. Settings and device configurations may be initialized to accomplish the desired device behavior. For example, the user can desire that the mobile device behave in a certain fashion at work and a different way at home. In some embodiments, work-centric applications can be displayed more prominently at work and personal applications can be displayed more prominently at home. The settings module can be responsible for modifying device settings or configurations based on detected location.

The one or more applications 434 can include any applications installed on the device 400, including without limitation, a browser, address book, contact list, email, instant messaging, word processing, keyboard emulation, widgets, JAVA-enabled applications, encryption, digital rights management, voice recognition, voice replication, a music player (which plays back recorded music stored in one or more files, such as MP3 or AAC files), etc.

The I/O subsystem 406 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 406 can include a display and user input devices such as a keyboard, mouse, and/or trackpad. In some embodiments, I/O subsystem 406 can include a touch-sensitive display. A touch-sensitive display can also accept input from the user based on haptic and/or tactile contact. In some embodiments, a touch-sensitive display forms a touch-sensitive surface that accepts user input. The touch-sensitive display/surface (along with any associated modules and/or sets of instructions in medium 402) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, the I/O subsystem can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 400 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

Examples of methods for modifying security levels based on detected location will now be described. The methods described focus on modified security levels; however, it is understood that the disclosure encompasses modifying other device behavior. The steps and the order of the steps described here are provided as examples only, and one having skill in the art will recognize that additional steps may be included, some steps may be omitted, and the order of the steps may be changed without departing from the scope of the present invention.

Figure 5A:
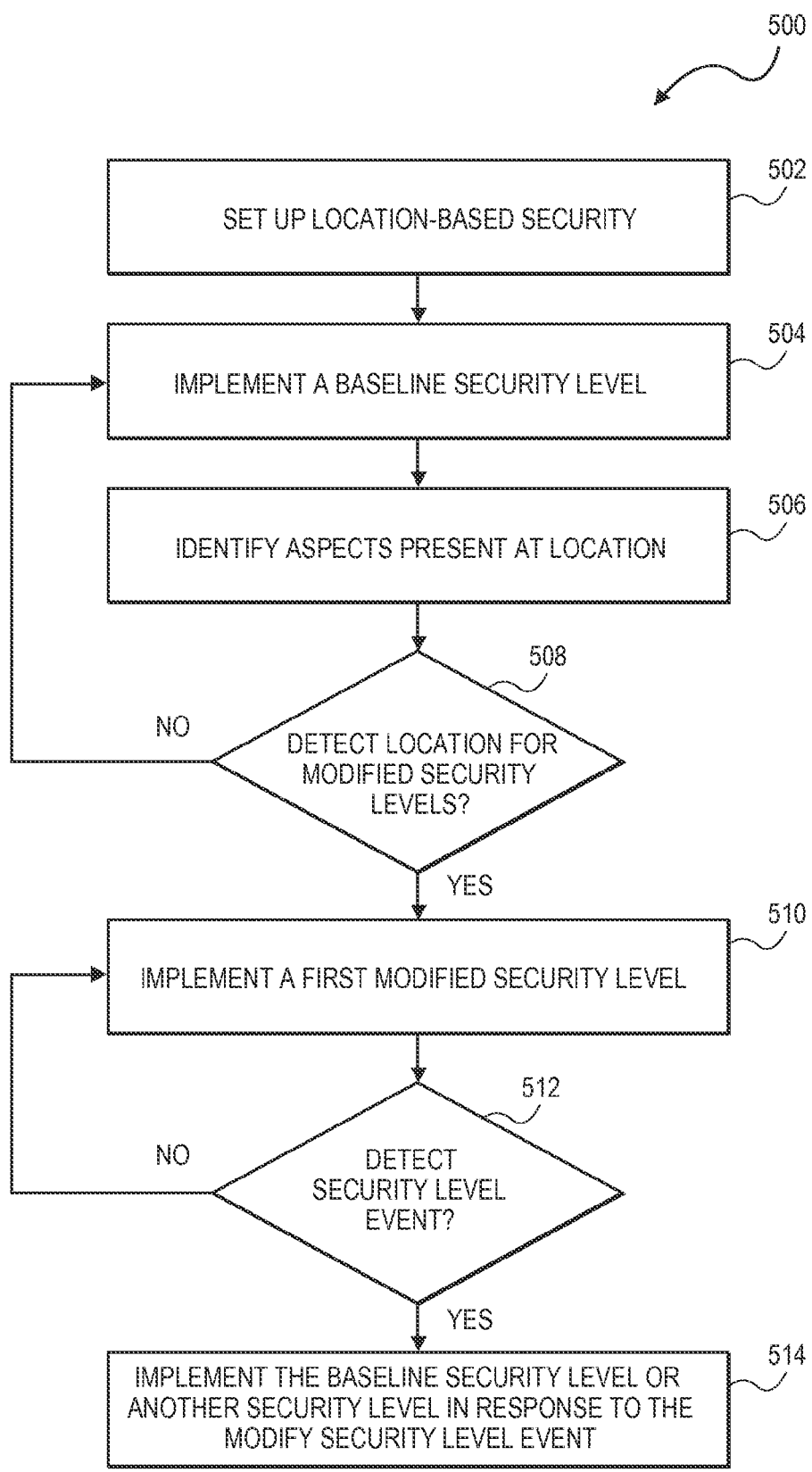
FIG. 5A is a flow diagram of a process for providing location-based security according to an embodiment of the present invention.

FIG. 5A is a flow diagram of a method 500 according to one embodiment of the present invention. The method may include set up and initialization blocks (e.g., 502, 504), location determination blocks (e.g., 506, 508), and security modification blocks (e.g., 510, 512, 514). In block 502, location-based security can be set up. Setting up location-based security can include receiving user input related to the default or baseline security level, the locations for modified security, the security levels to be implemented at the modified security locations, etc. User interfaces may be displayed on the mobile device allowing the user to set up location-based security. Based on the user input, the mobile device modifies configuration settings accordingly. The setup process is described in more detail in FIG. 6.

Security measures can be based on some combination of what the user knows, what the user has, or what the user is. For example, security measures based on what the user knows include passwords, passcodes, passphrases or other challenges (e.g., name of your first pet). Security measures based on what the user has include physical objects that identify a user based on the user's demonstrated possession of an object (e.g., keyfobs, smartcards, etc.). Security measures based on what the user is include DNA, fingerprints, retinal scans, voice identification, cadence of typing, walking, talking, and other biometric identification methods.

The term "security level" can refer to the types of security measure used (e.g., passcode, retinal scan, etc.) to control access to a mobile device. Each type of security measure used may be associated with a level of inherent security. For example, passcode-based security may be considered less secure than a retinal scan. The term "security level" can refer to the frequency with which a particular security measure is used. For example, a passcode may be required immediately or may only be required after 5 or more minutes of inactivity. The term "security level" can refer to the level of strength of a particular security measure used. For example, 4-digit numerical passcode may be associated with a lower security level than a longer alphanumeric password.

In block 504, the mobile device implements a baseline security level. The term "baseline security level" refers to a default security level that is implemented on the mobile device, e.g., when the mobile device is not at a location associated with a modified security level. For example, the device may implement a default security level at locations not specified as modified security locations. "Location for modified security" or "modified security location" refer to locations specified where the security level can vary from the baseline security level. For example, modified security locations can include locations where the security level is increased from the baseline level or locations where the security level is decreased from the baseline level.

In block 506, the mobile device identifies aspects at the location of the mobile device. For example, referring to FIG. 4, the identifying process can include receiving information from sensors 446, GPS unit 448, external port 436, RF circuitry 408, etc. Location module 426 and location context module 428 can process the information received and determine what aspects are present and not present at the location of the mobile device. Location context module 428 may populate a table with location aspects identified. For example, the table shown in FIG. 5B illustrates a table associating location aspects with location contexts according to an embodiment of the present invention.

The first column in FIG. 5B lists the types of location aspects that can be evaluated in one embodiment of the invention (e.g., GPS coordinates, visible networks, connected networks, etc.). The subsequent columns show location contexts ("Location context 1," "Location context 2," "Location context 3," etc.) and the location aspects that are associated with those location contexts. In some embodiments, certain location aspects are not identified after the mobile device analyzes its surrounding environment, as indicated by "-" in the figure. Any number of location contexts can be identified and each location context can include more, fewer, or different attributes than shown in FIG. 5B. Location contexts and the corresponding location aspects can be stored in a file or lookup table (on the mobile device or accessible to the mobile device from the cloud).

For example, "location context 1" has the following location contexts: the GPS coordinates within 100 meters of a particular address (e.g., the user's home address); the network named "Neighbor's Wi-Fi." is visible to the mobile device; the mobile device is connected to a network named "Home Airport Express" with "My iMac" visible on the network; and the mobile device is paired with a device named "My BT speakers." Location context 1 is an example of a fixed location. In another example, "location context 2" has the following location contexts: the mobile device is paired to a car audio system; the mobile device is connected to the car's USB port; and an audio signature is detected by the device sensors. When the specified aspects for location context 1 or location context 2 are identified, the mobile device can determine its location and modify device behavior accordingly.

FIG. 5C illustrates a table associating location contexts to locations and device security settings according to an embodiment of the present invention. For example, location context 1 is associated with a home location. When location context 1 is detected, a decreased security level is implemented. Location context 2 is associated with a car (mobile) location and a decreased security level. Location context 3 is associated with a work location and an increased security level. In the embodiment shown, all other locations are associated with a default security level. Any number of associations between location contexts, locations, and security settings can be stored and the table may include more, less, or different information than shown in FIG. 5B. Location contexts, the corresponding locations, and the corresponding security levels can be stored in a file or lookup table.

Referring back to decision block 508 in FIG. 5A, the mobile device can detect a location for modified security levels based on the one or more aspects that are present or are not present at the location of the mobile device. The location can be detected by analyzing a location context. Any given location can have a set of aspects associated with the location such that when the set (or a subset) of one or more aspects are detected, a mobile device can determine with threshold confidence that the mobile device is located at the particular location. If the mobile device determines it is at a location for modified security, the process moves onto block 510. Conversely, when the set (or a subset) of one or more aspects is not detected, the device cannot determine with threshold confidence that the mobile device is located at the particular location. If the mobile device cannot determine that it is at a location for modified security, the process returns to block 504.

In block 510, the mobile device can implement a modified security level. The identified location context can be correlated with a modified security level (or other device behavior). In some embodiments, the modified security level can be an increased security level. For example, if the mobile device determines the device is located at work, a passcode with automatic lock-out after 3 unsuccessful attempts is required. In some embodiments, the modified security level can be a decreased security level. For example, if the mobile device determines the device is located in the car, all passcode requirements are disabled. The location contexts, locations associated with the locations contexts, and the security levels for the modified security location can be correlated in a file or look-up table on the mobile device or accessible to the mobile device from the cloud.

In decision block 512, the mobile device determines whether a modified security level event has occurred. The term "security level event" can refer to detecting another location for modified security, detecting a failure of one or more aspects for a particular location context, detecting a timeout condition, or any other event that may trigger a change in the security level. In some embodiments, one or more aspects can change from true to false or otherwise fail to satisfy a predetermined threshold). For example, a connection with a home Wi-Fi network can fail and the mobile device can implement the baseline security level. In some embodiments, there is a predetermined timeout window. After detecting the location for modified security, a timer can be started. The modified security level can be used until the timer reaches a predetermined time when the modified security level "times out" and the baseline security level is implemented. If a security level event has not occurred, then the process returns to block 510. If a security level event has occurred, then the process continues to block 514.

In block 514, in response to a modified security level event, the mobile device can implement the baseline security level or another security level. In some embodiments, blocks 506, 508, and 510 may be repeated and a second location for modified security is detected (not shown). The second location may be associated with a different security level than the baseline. From this point, the process may repeat from block 504.

Figure 6:
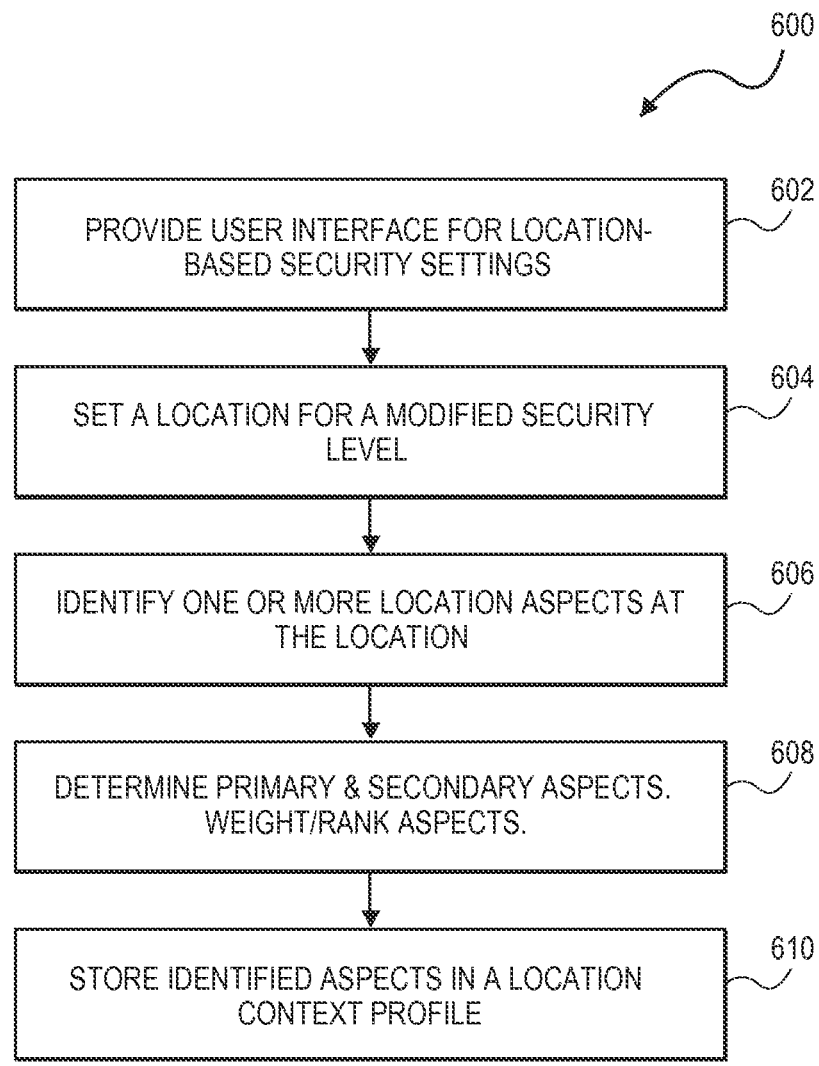
FIG. 6 is a flow diagram of initializing location-based security on a mobile device according to an embodiment of the present invention.

FIG. 6 is a flow diagram of a method 600 of setting up location-based security according to an embodiment of the present invention. Method 600 allows the user to set up location-based security. In block 602, the mobile device can provide a user interface for location-based security settings. The user interface is configured to present the user with various options for location-based security and receive user selections thereof. User interfaces are described below with reference to FIGS. 8-9.

In block 604, a location for modified security levels is set based on a user selection. In this block, a user provides a selection of a location for modified security levels. In some embodiments, the selected location is the current location of the mobile device at the time of setting up the location-based security. In some embodiments, the selected location is a location other than the current location of the mobile device at the time of setting up the location-based security (e.g., reconfiguring a previously defined location).

In block 606, one or more location aspects present at the location are identified. In some embodiments, the mobile device can identify aspects at the current location of the mobile device at the time of setting up the location-based security. After identifying the aspects, the system can decide how to define the location context (i.e., what location aspects to identify in order for the device to conclude it is located at a particular location). In some embodiments, the mobile device can detect a set of aspects and rank the aspects or disregard some of the aspects determined to not be indicative of location). In some embodiments, the user can manually enter information about aspects defining a location context.

In some embodiments, at block 608, primary and secondary aspects can be identified. In some embodiments, the location aspects available at the location are weighted or ranked. Some aspects may be more reliable than other aspects. More reliable aspects may be weighted more heavily to determine whether or not a mobile device is at a particular location. In block 610, a location context profile for the location is stored. The location context profile may include aspects at the location and a security requirement at the location.

Blocks 606, 608, and 610 can be performed transparently to the user. For example, in setting up location-based security, the user can simply enable location-based security, select a current location for modified security, and select a security level. Based on this information, the mobile device can determine what location aspects are accessed. In some embodiments, a downgrade in security from a relatively high security level to a relatively low security level may require more location aspects so that the device can determine with more confidence that the device is located at a particular location. This may result in fewer security downgrades due to false positives. In other embodiments, a relatively minor downgrade in security may require one or only a few location aspects. In some embodiments, the system may specify to the user how much the security can be decreased based on the aspects that are available to the device at the location at which the user wishes to modify security.

Figure 7:
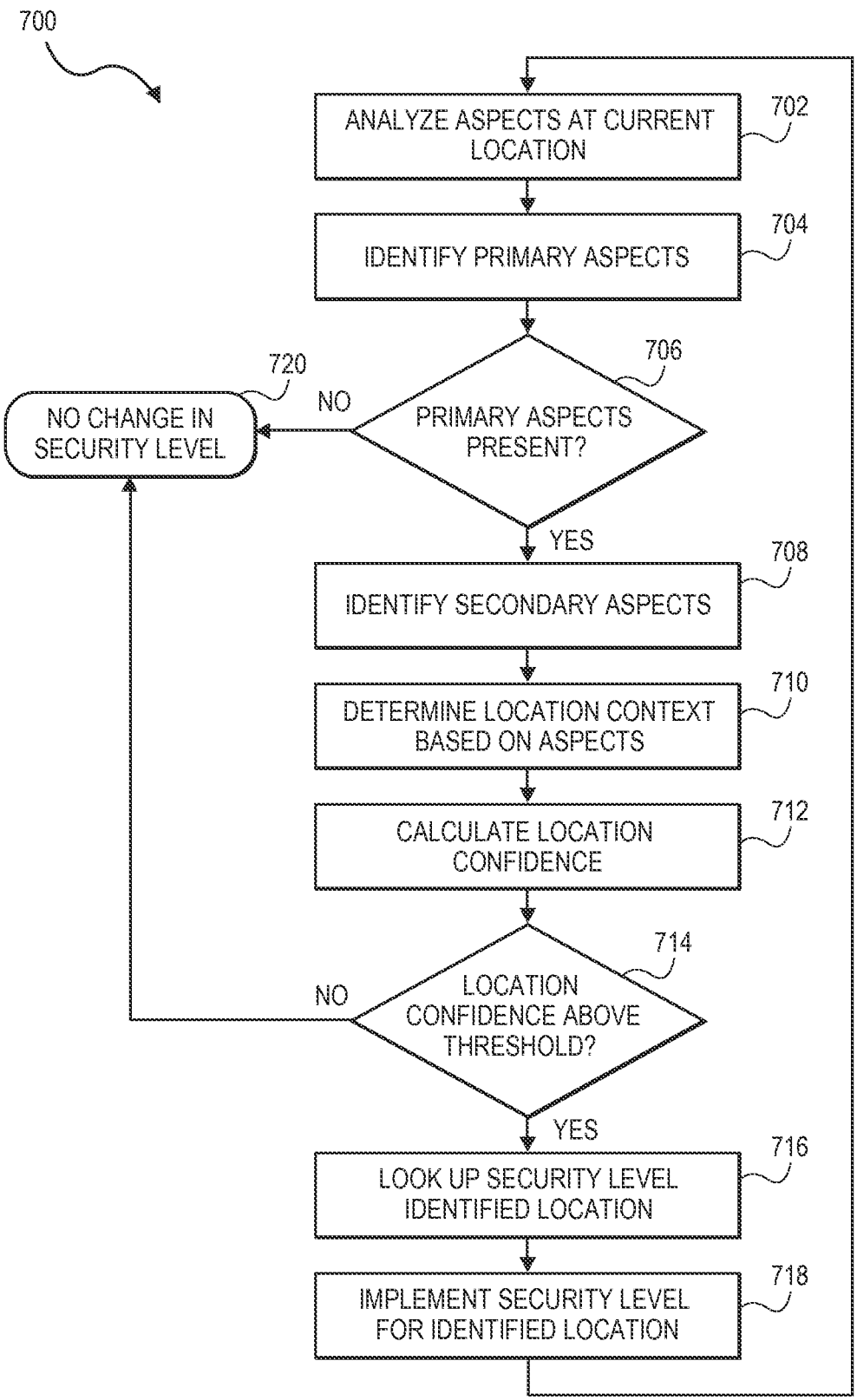
FIG. 7 is a flow diagram of determining the location of a mobile device using location aspects according to an embodiment of the present invention.

FIG. 7 is a flow diagram method 700 for determining location based on location aspects according to one embodiment of the present invention. In block 702, the mobile device identifies aspects at the current location of the mobile device. This step may include identifying available Wi-Fi networks, checking for available or paired Bluetooth devices, determining the current location of the mobile device with GPS or other location technology, analyzing device sensors, and the like. Available aspects at the location can be identified based on the analysis. By way of example, referring to FIG. 1A, mobile device 141 may analyze location aspects, including those present in environment 140.

In block 704, primary aspects are identified, and in block 706, the processor determines whether all primary aspects are present. As described above, some aspects may be considered primary aspects for modifying the security level, for example, if presence of the primary aspect is highly indicative of location. If the primary aspects are not present, the security level is not changed (block 720). For example, referring back to FIG. 1B, the mobile device may determine whether primary aspects (GPS position within 100 m of home address, connected to wireless access point maintaining "My Home Network," and estimated distance from access point is less than 50 m) are present.

In block 708, secondary aspects are identified. Secondary aspects can be used to determine that the device is at a particular location, done or more are present. Primary and secondary aspects may be associated with a location confidence value. The term "location confidence" refers to the reliability of a given location aspect. For example, a GPS location fix associated within 100 meters of a user's home may have a higher location confidence than a cell tower location fix. Similarly, the presence of a public Wi-Fi network (e.g., "Public Wi-Fi" networks associated with chain restaurants, etc.) may have a low location confidence because similarly or identically named networks may exist at multiple locations. However, when the "Public Wi-Fi" network can be more uniquely identified, e.g., by the MAC address for the access point, the location confidence may be higher. For example, referring back to FIG. 1B, the mobile device may determine whether secondary aspects (e.g., "Neighbor Wi-Fi" visible, etc.) are present.

In block 710, a location context is determined based on the aspects available at the location of the mobile device. In block 712, based on the location confidence levels of each aspect, an overall location confidence is calculated. Utile location confidence is greater than a predetermined threshold (block 714), then the security levels for the determined location are looked up in block 716. For example, the tables illustrated in FIGS. 5B and 5C may be used to reference the appropriate security level.

In block 718, the security level for the determined location is implemented by the mobile device. If the location confidence is not greater than a predetermined threshold, the security level is not changed (block 720). The process can be repeated as necessary to determine whether the location has changed or other modified security level event has occurred (e.g., timeout expired).

Referring now to FIG. 8A, user interface 810 shows an embodiment of a user interface for setting up or initializing location-based security settings. The user interface can include a display and the user can interact with the user interface in any suitable manner. The user interface 810 can provide an option 815 for enabling or disabling location-based security. When location-based security is "ON," the device can vary the security required to access or use the mobile device. The user interface 810 can include a soft key 820 for selecting an option to set the security level for the current location of the mobile device and/or a soft key 825 for selecting an option to set the security level for another location.

Referring to FIGS. 8B and 8C, in response to selecting an option to set the security level for the current location of the mobile device 820, one or more user interfaces, such as the user interfaces 840 and 870, can be displayed on the mobile device. In some embodiments, the user interface 840 has a field 845 for naming the location (e.g., "My Home Office"). The user interface can further include selection options (850, 855) for specifying whether the location is a mobile location or a fixed location. In the user interface shown, the user has selected "Fixed location" for the "My Home Office" location. The user interface can further include an indication of the status of the set up process 855 or list aspects that are present at the location (not shown). The user interface can further include a soft key 860 for selecting the level of security required.

In some embodiments, the user interface 870 has a field 875 for naming another location, in this case "My Car." The user interface can further include selection options (880, 885) for specifying whether the location is a mobile location or a fixed location. In the user interface shown, the user has selected "Mobile location" for the "My Car" location. The user interface can further include an indication of the status of the set up process 890 or list aspects that are present at the location (not shown). The user interface can include a soft key 895 for selecting the level of security required.

Referring to FIG. 9A, user interface 910 shows an embodiment of a user interface for setting up or initializing location-based security settings. The user interface 910 can provide soft keys for selecting a passcode requirement at a particular location; for example, soft key 911 is provided for selecting the default passcode requirement and soft key 912 is provided for selecting a modified security requirement. If soft key 911 is selected, the mobile device will implement the default passcode requirement. If soft key 912 is selected, the mobile device will implement a modified passcode requirement. The modified passcode requirement can be further customized by selecting soft key 913. In response to user selection of soft key 913, a user interface, such as user interface 940 (in FIG. 9B), can be provided so that the user can select the amount of time before a passcode is required when at a particular location. In some embodiments, selectable soft keys 941-946 can be provided for the user to select whether the timeout period should be 0, 1, 5, 15, 60 or 240 minutes at the particular location. Any suitable timeout period can be used.

In some embodiments, the user may specify what actions are allowed without a passcode at a location for modified security. There can be some functions or data that the user wishes to have when at certain locations. For example, when at a specific location (e.g., "My Car), settings options may be provided to enable certain features (allowing phone calls 914, browsing and playing music 915, and enabling voice controls 916). Other features may be disabled when at the specific location. For example, at a location for increased security, access to the more sensitive information (e.g., email, address book, or finances) might require higher authentication requirements while less sensitive information does not.

In some embodiments, a "power user" can modify the system provided location-based settings using an Advanced Settings user interface 970 in FIG. 9C. Using the advanced settings user interface 970, a user can select what location aspects are required or not required, which allows a user to fine-tune how a mobile device determines that the device is at a particular location. For example, a user can enable a GPS-based location aspect by toggling a soft key 971. In the embodiment shown, a GPS-based location aspect is enabled such that the location-based security requires that the GPS return a location fix within 100 meters of a particular address to implement a modified security level. In another embodiment, a user can enable a location aspect based on a specific wireless network by toggling soft keys 972 and 973. In the embodiment shown, the mobile device implements a modified security level only when it detects "My Home Network"; detection of "Neighbor Network" is not required. In another embodiment, a user can enable a location aspect based on a detection of one or more devices using a short-range communication technology by toggling soft keys 974 and 975. In the embodiment shown, the mobile device implements a modified security level only when "My Keyboard" and "My Magic Mouse" are detected. In another embodiment, a user can enable a location aspect based on a challenge sent over the network. In some embodiments, by toggling a soft key 976, the mobile device implements a modified security level only when it detects a particular device (e.g., an AppleTV) on a particular network (e.g., "My Home Network"). In another example, by toggling a soft key 977 to OFF, the mobile device does not analyze the environmental signature when determining what security level to implement.

FIGS. 10A and 10B are diagrams of embodiments of various user interfaces according to the present invention. In FIG. 10A, user interface 1010 can be displayed after the device has determined it is in a modified security location. For example, using process 700 described above, a modified security level for the location "My Car" can be implemented based on the location aspects available. Therefore, after the user unlocks the mobile device, no passcode is required and the device can be used. In FIG. 10B, user interface 1060 shows an embodiment where one or more of the primary location aspects for a "home" location ceased to be detected. Therefore, the mobile device determined that the device was no longer at the home location and implemented the base line security level (e.g., 4-digit numeric passcode). The user interfaces can include an indication of why a security requirement is increased/decreased or what security measure is (or is not being) required. This can inform the user that location-based security is working (or not working) and can help the user avoid "false positives" or "false negatives." If false positives or false negatives are encountered by the user, the user can use an advanced settings user interface to fine-tune the location aspects required.

While the invention has been described with respect to specific embodiments, one skilled in the art will recognize that numerous modifications are possible and that features described with specific reference to one embodiment can be applied in other embodiments. Embodiments of the present invention can be applied to password/passcode scenarios other than the passwords/passcodes required to "unlock" mobile devices. For example, embodiments of the present invention can apply to any password scenario (e.g., computer login, iTunes login, web login, passwords/passcodes for apps running on the mobile device, etc.). Security is not limited to passcodes and modifying settings can include requiring a security object (e.g., keyfob, biometric identification, and/or other security measures).

Some embodiments of the present invention also provide for modifying device settings or device behavior (other than security levels) based on the detected location. Many users of mobile devices rely on their devices in their day-to-day activities. The mobile device can be used for different tasks at different locations. Therefore, the behavior of the mobile device can change based on the detected location. For example, at work, a user might want email, calendar, and address book applications more prominently displayed on the mobile device, but while at home the media player app, FaceTime, and Messages app can be more prominently displayed. In another example, at home, a user might want the lockscreen image to be a personal photo, but while at work, the user might want a professional photo. In some embodiments, any aspect of device behavior or any setting or configuration can be modified based on location, including display settings (e.g., background image), audio settings (e.g., silent/vibrate mode), available applications, power settings, etc.

Some embodiments of the present invention can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above make reference to specific hardware and software components, those skilled in the art will appreciate that different combinations of hardware and/or software components can also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. It is understood that "storage" of data is distinct from propagation of data using transitory media such as carrier waves. Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method of managing security levels, the method comprising:
   implementing, at a mobile device, a baseline security level;
   detecting, by the mobile device, a plurality of location aspects available at a location of the mobile device, wherein each of the location aspects indicate an attribute of the location;
   determining, by the mobile device, a first location context of the mobile device based on the detected plurality of location aspects;
   associating, by the mobile device, the first location context with a first location for modified security; and
   implementing, by the mobile device, a first security level based on the first location context.

2. The method of claim 1, wherein one of the plurality of location aspects includes geographic location information.

3. The method of claim 1, wherein one of the plurality of location aspects includes proximity to a particular device.

4. The method of claim 1, wherein one of the plurality of location aspects includes detection of a particular network.

5. The method of claim 4, wherein one of the plurality of location aspects includes detection of a particular access point associated with the particular network.

6. A non-transitory computer readable storage medium having program code stored thereon, the program code including instructions that, when executed by a processor in a mobile device, cause the processor to execute operations comprising:
   implementing a baseline security level;
   detecting a plurality of location aspects available at a location of the mobile device, wherein each of the location aspects indicate an attribute of the location;
   determining a first location context of the mobile device based on the detected plurality of location aspects;
   associating the first location context with a first location for modified security; and
   implementing a first security level based on the first location context.

7. The computer readable storage medium of claim 6, wherein one of the plurality of location aspects includes geographic location information.

8. The computer readable storage medium of claim 6, wherein one of the plurality of location aspects includes proximity to a particular device.

9. The computer readable storage medium of claim 6, wherein one of the plurality of location aspects includes detection of a particular network.

10. The computer readable storage medium of claim 9, wherein one of the plurality of location aspects includes detection of a particular access point associated with the particular network.

11. A method of initializing location-based security levels, the method comprising:
    receiving, at a mobile device, an instruction to set up a modified security level associated with a first location;
    analyzing a plurality of location aspects available at the first location, wherein each of the location aspects indicate an attribute of the location;
    selecting one or more available location aspects to associate with the first location; and
    assigning a first security level to the first location; and
    implementing, by the mobile device, the first security level based on detecting one or more location aspects associated with the first location.

12. The method of claim 11, wherein the first security level requires an increased or decreased security requirement.

13. The method of claim 11, wherein analyzing the plurality of location aspects available at the first location includes detecting available wireless networks.

14. The method of claim 11, wherein analyzing the plurality of location aspects available at the first location includes detecting proximate devices using a short-range wireless communication technology.

15. The method of claim 11 further comprising:
    displaying the plurality of location aspects available at the first location on a display of the mobile device; and
    receiving, from a user input, a modification of the selected one or more available location aspects to associate with the first location.

16. A non-transitory computer readable storage medium having program code stored thereon, the program code including instructions that, when executed by a processor in a mobile device, cause the processor to execute operations comprising:

receiving an instruction to set up a modified security level associated with a first location;

analyzing a plurality of location aspects available at the first location, wherein each of the location aspects indicate an attribute of the location;

selecting one or more available location aspects to associate with the first location; and assigning a first security level to the first location; and implementing, by the mobile device, the first security level based on detecting one or more location aspects associated with the first location.

17. The computer readable storage medium of claim 16, wherein the first security level requires an increased or decreased security requirement.

18. The computer readable storage medium of claim 16, wherein analyzing the plurality of location aspects available at the first location includes identifying available wireless networks.

19. The computer readable storage medium of claim 16, wherein analyzing the plurality of location aspects available at the first location includes identifying for proximate devices using a short-range wireless communication technology.

20. The computer readable storage medium of claim 16, wherein the method further comprises:

displaying the plurality of location aspects available at the first location on a display of the mobile device; and receiving, from a user input module, a modification of the selected one or more available location aspects to associate with the first location.

21. A mobile device comprising:

one or more hardware modules for detecting location aspects;

an interface configured to communicate with the one or more hardware modules; and control logic coupled to the interface, the control logic being configured to:

implement a first security level;

detect one or more location aspects available at a current location of the mobile device, wherein each of the location aspects indicate an attribute of the location;

determine a location context of the mobile device based on the one or more location aspects detected;

determine whether the location context is associated with a location for modified security;

if the location context is associated with a location for modified security, implement a second security level at the location for modified security; and if the location context is not associated with a location for modified security, continue to implement the first security level.

22. The mobile device of claim 21, wherein the hardware modules include a GPS unit.

23. The mobile device of claim 21, wherein the hardware modules include one or more of the following: a long-range wireless transceiver, a medium-range wireless transceiver, or a short-range wireless transceiver.

24. The mobile device of claim 23, wherein the control logic is further configured to:

determine whether one more or more wireless networks or wireless devices are available using at least one of the long-range wireless transceiver, the medium-range wireless transceiver, or the short-range wireless transceiver.

25. The mobile device of claim 21, wherein the first security level is a baseline security level and the second security level is an increased security level.

* * * * *